United States Patent
Gutsche et al.

(10) Patent No.: US 8,635,904 B2
(45) Date of Patent: Jan. 28, 2014

(54) TORQUE-APPLICATION TEST STAND FOR TRANSMISSIONS

(75) Inventors: Joachim Gutsche, Erlangen (DE); Michael Korzuschnik, Hetzles (DE); Günter Lorenz, Nuremberg (DE)

(73) Assignee: Siemens Aktiengesellschaft, Munich (DE)

(*) Notice: Subject to any disclaimer, the term of this patent is extended or adjusted under 35 U.S.C. 154(b) by 123 days.

(21) Appl. No.: 13/435,384

(22) Filed: Mar. 30, 2012

(65) Prior Publication Data
US 2012/0252618 A1 Oct. 4, 2012

(30) Foreign Application Priority Data
Mar. 30, 2011 (EP) .................................... 11160433

(51) Int. Cl.
*G01M 13/02* (2006.01)
(52) U.S. Cl.
USPC ........................................................ 73/116.04
(58) Field of Classification Search
USPC ............... 73/115.01, 115.02, 115.03, 115.04, 73/116.01, 116.04, 116.05
See application file for complete search history.

(56) References Cited

U.S. PATENT DOCUMENTS

| | | | |
|---|---|---|---|
| 4,294,112 A | 10/1981 | Moore et al. | |
| 4,615,212 A | 10/1986 | Kugler et al. | |
| 5,537,865 A * | 7/1996 | Shultz | 73/115.02 |
| 6,343,504 B1 * | 2/2002 | Shultz | 73/116.01 |
| 7,610,819 B2 * | 11/2009 | Barnes et al. | 73/862.31 |
| 8,281,653 B2 * | 10/2012 | Schrotter | 73/116.02 |
| 8,418,540 B2 * | 4/2013 | Schrotter | 73/116.02 |
| 2008/0126889 A1 * | 5/2008 | Barnes et al. | 714/704 |
| 2011/0011168 A1 * | 1/2011 | Schrotter | 73/116.02 |
| 2011/0011169 A1 * | 1/2011 | Schrotter | 73/116.02 |

FOREIGN PATENT DOCUMENTS

| | | |
|---|---|---|
| DE | 34 24 923 | 2/1986 |
| DE | 10 2006 047268 | 4/2008 |
| EP | 0 377 950 | 7/1990 |
| WO | WO 2008/040331 | 4/2010 |

* cited by examiner

*Primary Examiner* — Eric S McCall
(74) *Attorney, Agent, or Firm* — Cozen O'Connor

(57) ABSTRACT

A torque-application test stand in which a belt drive or chain drive having two fixed belt stations and having one belt station which is movable in a linear manner between the two fixed belt stations is provided. A telescopic universal-joint propeller shaft for length compensation is arranged between the belt station which is movable in the linear manner and a bearing support for a test object. The belt station which is movable in the linear manner is moved during testing, thus producing a superimposed rotary motion of the universal-joint propeller shaft connected to the test object.

12 Claims, 2 Drawing Sheets

TORQUE-APPLICATION TEST STAND FOR TRANSMISSIONS

BACKGROUND OF THE INVENTION

1. Field of the Invention

The present invention relates to testing equipment and, more particularly, to a torque-application test stand for transmissions.

2. Description of the Related Art

DE 10 2006 047 268 A1 discloses a loading apparatus for a test stand for testing a test object, which includes at least two loading machines. A first loading machine comprises a first electric motor, and a second loading machine includes a second electric motor. The electric motors are each designed for a predefined loading range, where the loading range of the first loading machine differs from the loading range of the second loading machine. The loading machines can be joined individually to the test object and can be connected via a coupling to transfer a torque. A range to be tested of the test object is thus covered substantially completely.

EP 0 377 950 A2 describes a machine simulation apparatus for creating an input torque for test purposes on a drive apparatus for a motor vehicle, where the machine simulation apparatus comprises a first and a second electric motor and a step-up transmission unit. An output of the step-up transmission unit can be connected to the input of the power shift transmission or drive transmission. The transmission unit includes a first input shaft, which is connected to the output of the first motor and carries a first input gearwheel. The first input gearwheel is driven by the first input shaft. In addition, the transmission unit includes a second input shaft, which is connected to the output of the second motor and carries a second input gearwheel. The second input gearwheel is driven by the second input shaft.

DE 34 24 923 A1 discloses a torque-application test stand for testing components designed for torque transfer, such as shafts, couplings, joints or gearwheels. One or more torque-application couplings, which is/are in each case integrated in a gearwheel of two transmissions is/are used for this purpose. A compact design is thus produced and realistic, extremely quick changes to rotational speed, torque and rotational direction as well as oscillation tests are possible at high frequency and in a highly accurate manner.

SUMMARY OF THE INVENTION

It is an object of the present invention is to provide a reliable and economically producible torque-application test stand for transmissions.

This and other objects and advantages are achieved in accordance with the invention by a torque-application test stand for transmissions that includes a drive motor and a drive shaft which is joined to the drive motor and which includes at least one mechanical interface for connection to a drive shaft or output shaft of a first transmission. The torque-application test stand is additionally provided with a balance shaft having at least two mechanical interfaces for connection between the output shaft of the first transmission and an output shaft of a second transmission, or for connection between the drive shaft of the first transmission and the drive shaft of the second transmission. The two transmissions are preferably identical in construction or are substantially identical in construction.

The torque-application test stand in accordance with the invention additionally includes an output shaft having at least one mechanical interface for connection to the drive shaft or output shaft of the second transmission. A circulating tensioning device, such as a chain or a belt, is connected with a positive fit to at least a first, second and third planetary gear. A shaft rotationally engaged with the first or second planetary gear is mounted in each of a first and second fixed station. The shaft mounted in the first fixed station is the drive shaft. A third fixed station movable between the first and second fixed stations in or against the direction of circulation of the tensioning device is additionally provided, and a shaft that is rotationally engaged with the third planetary gear is mounted in the third fixed station. The shaft mounted in the third fixed station forms the output shaft. The drive shaft, the first transmission, the balance shaft, the second transmission, the output shaft and the tensioning device thus form a closed drive circuit. The torque-application test stand in accordance with the invention eliminates the need for a previously conventional phase shifter transmission. As a result, a simplified test stand design and cost savings are provided.

The drive shaft is preferably additionally mounted at least in a first bearing support arranged between the first fixed station and the first transmission. Here, the output shaft is additionally mounted at least in a second bearing support arranged between the third fixed station and the second transmission. In addition, the drive shaft may have a universal-joint propeller shaft portion, such as a Cardan shaft portion, arranged between the first fixed station and the first bearing support. The output shaft includes a universal-joint propeller shaft portion arranged between the third fixed station and the second bearing support. In accordance with a particularly preferred embodiment, the universal-joint propeller shaft portion of the output shaft includes a length compensation element, i.e., a telescope element, to compensate for a linear motion of the third station.

The third fixed station is preferably movable in a linear manner, linearly between the first and second fixed stations, so that a torque applied as a result of a superimposed rotatory motion of the output shaft can be clearly defined. For example, the third fixed station may be movable in a linear manner during testing, and a superimposed rotary motion of the output shaft can be produced by a linear motion of the third fixed station to produce an applied torque.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be explained in greater detail with reference to an exemplary embodiment and with the aid of the drawing, in which.

DETAILED DESCRIPTION OF THE PREFERRED EMBODIMENTS

Figure 1:
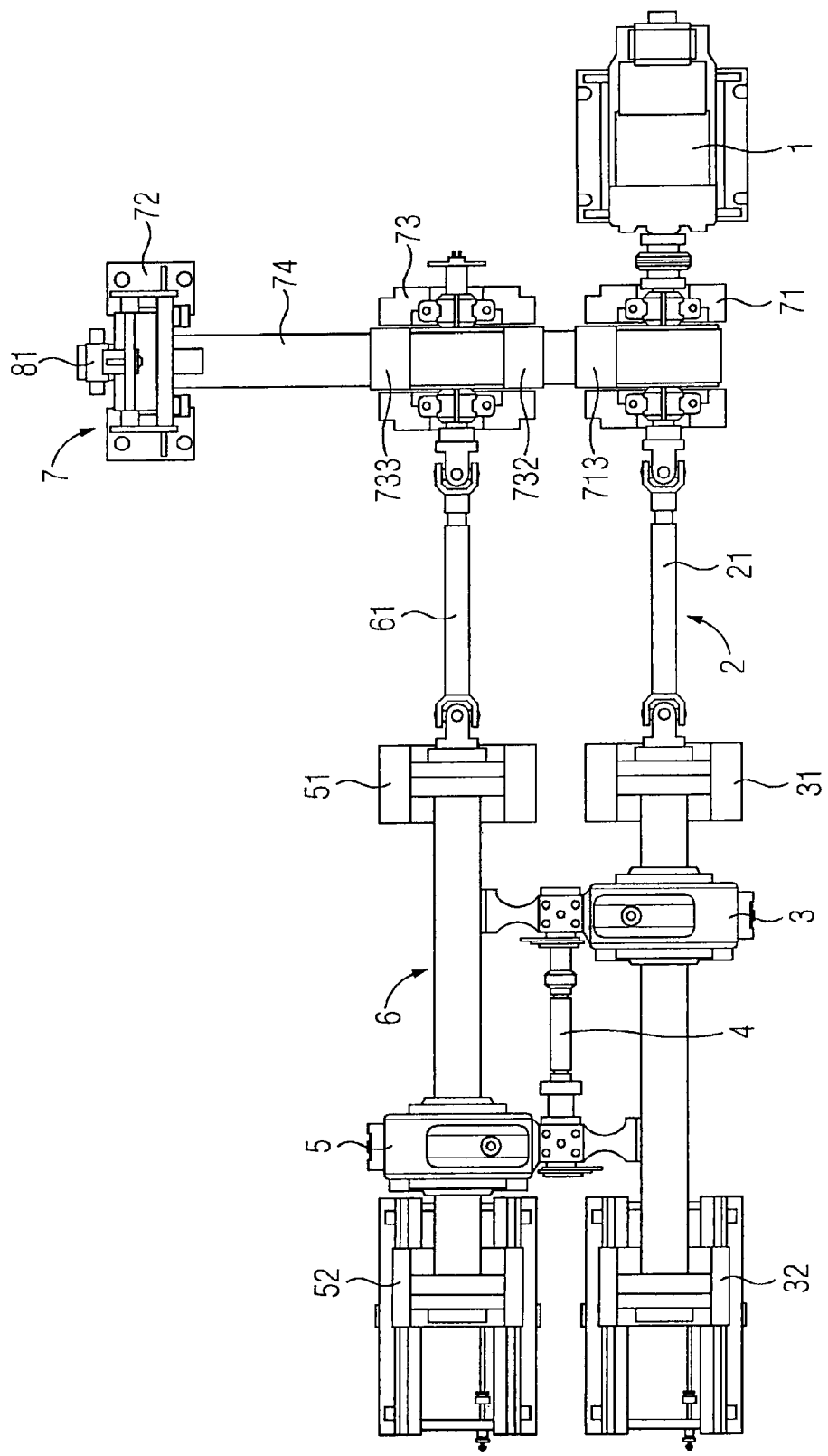
FIG. 1 shows a plan view of a torque-application test stand for transmissions, where the torque-application test stand includes a tensioning device drive system.

The torque-application test stand for transmissions illustrated in FIG. 1 includes a drive motor 1 and a drive shaft 2 which is joined to the drive motor 1 and which includes at least one mechanical interface for connection to a drive shaft or output shaft of a first transmission 3. A balance shaft 4 is joined between the output shaft of the first transmission 3 and an output shaft of a second transmission 5, or between the drive shaft of the first transmission 3 and the drive shaft of the second transmission 5, and comprises corresponding mechanical interfaces for connection to drive shaft flanges or output shaft flanges of the first and second transmissions 3, 5. An output shaft 6 of the torque-application test stand is joined to a drive shaft or output shaft of the second transmission 5 via a mechanical interface. In the present exemplary embodiment, the second transmission 5 represents a test object, and both the first and second transmissions 3, 5 are identically constructed.

Figure 2:
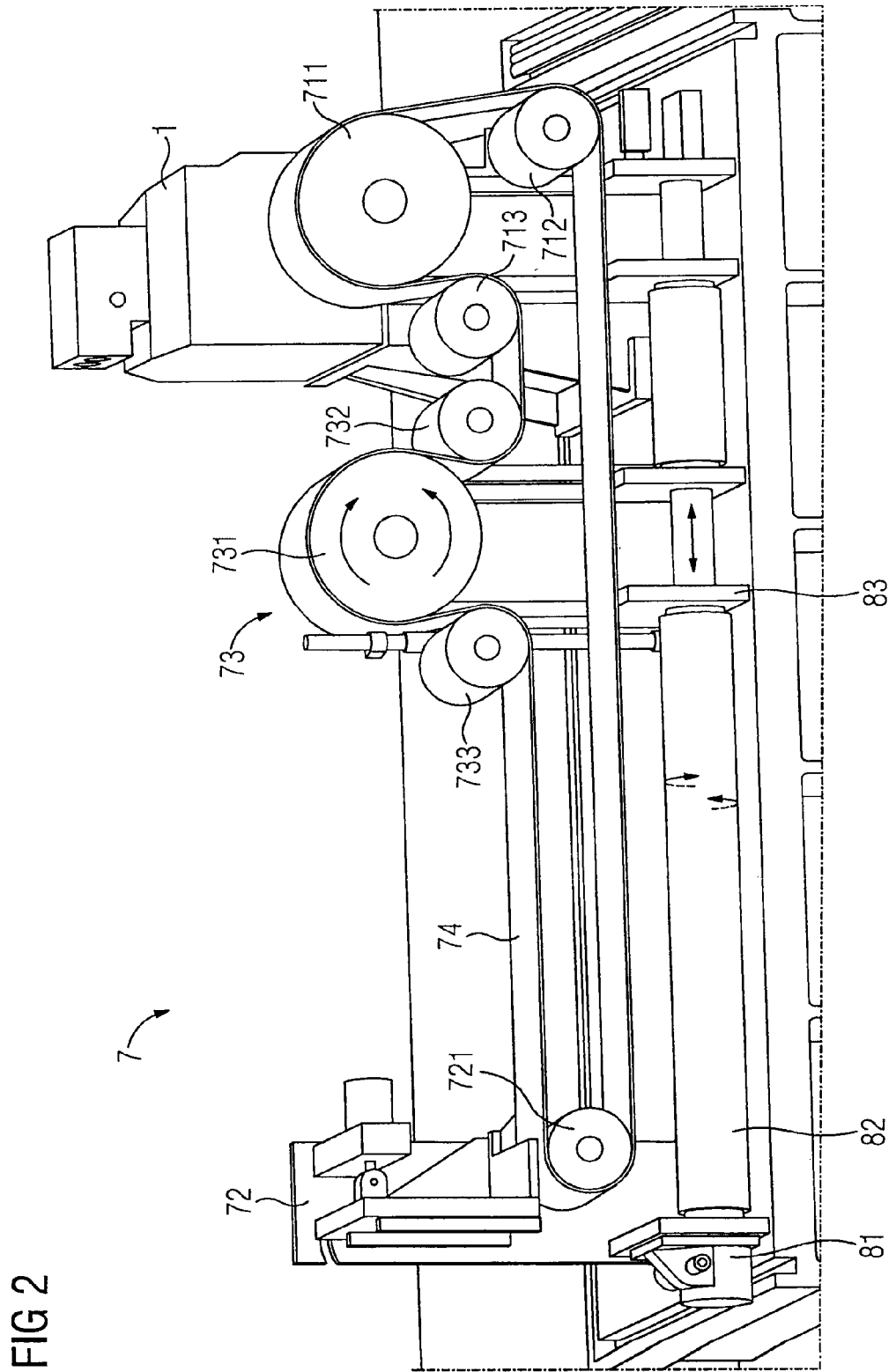
FIG. 2 shows a perspective view illustration of three fixed stations of the tensioning device drive system of the torque-application test stand of FIG. 1.

FIG. 2 is a perspective view illustration of the tensioning device drive system 7 of the torque-application test stand of FIG. 1. The tensioning device drive system 7 includes a circulating tensioning device 74, preferably a chain or a belt. The tensioning device 74 is connected with a positive fit to a total of seven planetary gears 711, 712, 713, 721, 731, 732, 733. In addition, the tensioning device drive system 7 includes a first 71 fixed station and a second fixed station 72, in each of which a shaft is mounted which is rotationally engaged with a first 711 planetary gear or a second planetary gear 721. The shaft mounted in the first station 71 is the drive shaft 2 of the torque-application test stand. A third fixed station 73, which is movable in a linear manner between the first and second fixed stations 71, 72 either in or against the direction of circulation of the tensioning device 74, is additionally provided, and a shaft which is rotationally engaged with a planetary gear 731 is mounted in the third fixed station 73. The shaft mounted in the third station 73 is the output shaft 6 of the torque-application test stand. The drive shaft 2, the first transmission 3, the balance shaft 4, the second transmission 5, the output shaft 6 and the tensioning device 74 thus form a closed drive circuit.

During testing, the third station 73 is movable in a linear manner by an electric motor 81, a threaded rod 82 joined to the electric motor 81, and a slide block 83 driven by the threaded rod 82. The slide block 83 is connected directly to the third station 73. A superimposed rotary motion of the output shaft 6 can be produced by a linear motion of the third station 73 to produce an applied torque.

The drive shaft 2 is additionally mounted in a first bearing support 31 arranged between the first station 71 and the first transmission 3. The output shaft 6 is additionally mounted in a second bearing support 51 arranged between the third fixed station 73 and the second transmission 5. In addition, a third bearing support 32 and a fourth bearing support 52 are provided for mounting the drive shaft 2 and the output shaft 6.

The drive shaft 2 includes a universal-joint propeller shaft portion 21 arranged between the first station 71 and the first bearing support 31. The output shaft 6 accordingly comprises a universal-joint propeller shaft portion 61 arranged between the third station 73 and the second bearing support 51. The universal-joint propeller shaft portion 61 of the output shaft 6 additionally has a telescope element as a length compensation element with regard to a linear motion of the third fixed station 73.

In accordance with an alternative embodiment, instead of a third fixed station 73 which is movable in a linear manner between the first 71 and second stations 72, at least one planetary gear 712, 713, 721, 732 can be formed displaceably at the first fixed station 71, the second fixed station 72 and/or the third fixed station 73 so as to change the extent of the tensioning device. The third fixed station 73 is also fixed in this case. An extension of the tensioning device 74 between the first and second fixed stations 72, 71, with the extension being effective for a tensioning means transmission, can be changed by displacement of at least one planetary gear 712, 713, 721, 732. As a result, torque is applied between the drive shaft 2 and the output shaft 6. For example, an application of torque can be produced by repositioning at least one planetary gear 713, 732 arranged between the first and third fixed stations 73, 71. Here, at least one outer planetary gear 712, 721 at the first fixed station 71 or the second fixed station 72 is additionally displaced in terms of its axial position to compensate for the length of the tensioning means. In accordance with an alternative embodiment, the second and third fixed stations 72, 73 can be united to form a combined, fixed station in which the output shaft 6 is mounted.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A torque-application test stand for transmissions, comprising:

a drive motor;

a drive motor drive shaft adjoined to the drive motor and having at least one mechanical interface for connection to a first drive shaft or first output shaft of a first transmission;

a balance shaft having at least two mechanical interfaces for one of a connection between the first output shaft and a second output shaft of a second transmission, and a connection between the first drive shaft and a second drive shaft of the second transmission;

a test stand output shaft having at least one mechanical interface for connection to the second drive shaft or the second output shaft of the second transmission;

a circulating tensioning device connected with a positive fit to at least a first, a second and a third planetary gear;

a first fixed station and a second fixed station, the first fixed station and the second fixed station having respective shafts mounted therein respectively rotationally engaged with the first stand and second planetary gears, the shaft mounted in the first fixed station comprising the drive motor drive shaft;

a third station movable between the first fixed station and the second fixed station in or against a direction of circulation of the tensioning device, a shaft which is rotationally engaged with the third planetary gear being mounted in the third station, the shaft mounted in the third station comprising the test stand output shaft;

wherein the drive motor drive shaft, the first transmission, the balance shaft, the second transmission, the test stand output shaft and the tensioning device form a closed drive circuit.

2. The torque-application test stand as claimed in claim 1, wherein the third station is movable linearly during testing, and wherein a superimposed rotary motion of the output shaft is produceable by the linear motion of the third station to produce an applied torque.

3. The torque-application test stand as claimed in claim 1, wherein the circulating tensioning device is a chain or a belt.

4. The torque-application test stand as claimed in claim 1, wherein the third station is movable linearly between the first fixed station and the second fixed station.

5. The torque-application test stand as claimed in claim 4, wherein the third station is movable linearly during testing, and wherein a superimposed rotary motion of the output shaft is produceable by the linear motion of the third station to produce an applied torque.

6. The torque-application test stand as claimed in claim 1, wherein one of the first and second transmissions comprises a test object, and wherein the first and second transmissions are identically or substantially identically constructed.

7. The torque-application test stand as claimed in claim 6, wherein the second and third fixed stations are united to form a combined, fixed station in which the test stand output shaft is mounted.

8. The torque-application test stand as claimed in claim 1, wherein the drive motor drive shaft is additionally mounted at least in a first bearing support arranged between the first fixed station and the first transmission, and wherein the test stand output shaft is additionally mounted at least in a second bearing support arranged between the third station and the second transmission.

9. The torque-application test stand as claimed in claim 8, wherein the drive motor drive shaft includes a universal-joint propeller shaft portion arranged between the first fixed station and the first bearing support, and wherein the test stand output shaft includes a universal-joint propeller shaft portion arranged between the third station and the second bearing support.

10. The torque-application test stand as claimed in claim 9, wherein the universal-joint propeller shaft portion of the test stand output shaft includes a length compensation element.

11. The torque-application test stand as claimed in claim 10, wherein the length compensation element comprises a telescope element.

12. A torque-application test stand for transmissions, comprising:
a drive motor;
a drive motor drive shaft adjoined to the drive motor and having at least one mechanical interface for connection to a first drive shaft or first output shaft of a first transmission;
a balance shaft having at least two mechanical interfaces for one of a connection between the first output shaft and a second output shaft of a second transmission, and a connection between the first drive shaft and a second drive shaft of the second transmission;
a test stand output shaft having at least one mechanical interface for connection to the second drive shaft or the second output shaft of the second transmission;
a circulating tensioning device connected with a positive fit to at least a first, a second and a third planetary gear;
a first fixed station and a second fixed station, the first fixed station and the second fixed station having respective shafts mounted therein respectively rotationally engaged with the first stand and second planetary gears, the shaft mounted in the first fixed station comprising the drive motor drive shaft;
a third station fixed such that at least one displaceable planetary gear is provided at at least one of the first fixed station, the second fixed station and the third fixed station to change an extent of the tensioning device, a shaft which is rotationally engaged with the third planetary gear being mounted in the third fixed station, the shaft mounted in the third fixed station comprising the test stand output shaft;
wherein an extension of the tensioning device between the first station and the second fixed station, said extension being effective for a tensioning device transmission, is changeable by displacement of the at least one displaceable planetary gear;
wherein torque is applicable between the drive shaft and the output shaft by changing an effective length of the tensioning device; and
wherein the drive motor drive shaft, the first transmission, the balance shaft, the second transmission, the test stand output shaft and the tensioning device form a closed drive circuit.

\* \* \* \* \*